United States Patent [19]

Uyama et al.

[11] Patent Number: 5,682,283
[45] Date of Patent: Oct. 28, 1997

[54] ROTARY HEAD APPARATUS HAVING SHORT DISTANCE BETWEEN MAGNETIC HEADS AND ROTARY TRANSFORMER

[75] Inventors: Kazuyuki Uyama, Saitama-ken; Masao Segawa, Kanagawa-ken; Takahumi Hukagawa, Saitama-ken, all of Japan

[73] Assignee: Kabushiki Kaisha Toshiba, Japan

[21] Appl. No.: 292,208

[22] Filed: Aug. 18, 1994

[30] Foreign Application Priority Data

Aug. 19, 1993 [JP] Japan ................................. 5-205315

[51] Int. Cl.⁶ ............................ G11B 5/52; G11B 21/04
[52] U.S. Cl. ...................... 360/107; 360/84; 360/130.24
[58] Field of Search .................................. 360/107, 108, 360/109, 84, 85, 130.22, 130.23, 130.24

[56] References Cited

U.S. PATENT DOCUMENTS

| | | | |
|---|---|---|---|
| 4,654,738 | 3/1987 | Kato et al. | 360/108 |
| 5,010,432 | 4/1991 | Fukushima et al. | 360/108 |
| 5,019,926 | 5/1991 | Van Thuijl et al. | 360/84 |

FOREIGN PATENT DOCUMENTS

| | | |
|---|---|---|
| 62-208409 | 9/1987 | European Pat. Off. . |
| 0349430 | 1/1990 | European Pat. Off. . |
| 0468129 | 1/1992 | European Pat. Off. . |
| 0488811 | 6/1992 | European Pat. Off. . |
| 61-219116 | 9/1986 | Japan . |
| 61-294611 | 12/1986 | Japan . |
| 1307901 | 12/1989 | Japan . |
| 2-292712 | 12/1990 | Japan . |
| 3-194702 | 8/1991 | Japan . |

*Primary Examiner*—Stuart S. Levy
*Assistant Examiner*—David L. Ometz
*Attorney, Agent, or Firm*—Cushman Darby & Cushman Intellectual Property Group of Pillsbury Madison & Sutro, LLP

[57] ABSTRACT

A rotary head apparatus including a circuit board with an optimum and shortest distance between magnetic heads of the rotary head apparatus and a rotary transformer thereof. The members used in the present invention connect the above elements in a simple construction and positively transmitting signals can be reached. The rotary head apparatus comprises a first conductive member which is in contact with and electrically connected to lead terminals of a winding of a magnetic head and to an electronic circuit member. The circuit member is installed on the upper surface of the circuit board (the magnetic head side), which is mounted to a rotary drum equipped with the magnetic heads. A second conductive member is connected to the electronic circuit member and is in contact with and is electrically connected to lead terminals of a winding of a rotor of a rotary transformer. It is possible to arrange the circuit board with an optimum and shortest distance between the magnetic heads and the rotary transformer to connect these elements in a simple construction and to transmit signals with a high degree of certainty and with reduced transmission losses without being badly affected by oscillations, etc.

2 Claims, 2 Drawing Sheets

5,682,283

ROTARY HEAD APPARATUS HAVING SHORT DISTANCE BETWEEN MAGNETIC HEADS AND ROTARY TRANSFORMER

BACKGROUND OF THE INVENTION

1. Field of the Invention

The present invention generally relates to a magnetic recording/reproducing apparatus, etc., for instance, a video tape recorder (hereinafter, referred to as VTR), and more particularly, to a rotary head apparatus utilized in VTRs.

2. Background Information

Conventionally, a helical scanning system is used for a magnetic recording/reproducing apparatus such as a VTR, to perform a magnetic recording and/or reproducing by rotary magnetic heads.

On such a helical scanning system VTR, for instance, in the reproducing process, at least two magnetic heads are installed on a rotary drum and these heads rotate as if to helically trace a magnetic recording medium in its running direction to reproduce signals. The signals thus obtained are then amplified to a specified level by an electronic circuit such as a reproduction preamplifier and supplied to a reproducing circuit via a non-contact rotary transformer (hereinafter, referred to as a rotary transformer) for reproducing recorded signals. Further, in the case of recording by a magnetic recording/reproducing apparatus, signals to be recorded are supplied via such a rotary transformer. Voltages and currents required for the recording operation are supplied to the magnetic head by such an electric circuit as a recording amplifier. The magnetic head then rotates to helically trace the recording medium so that the signals are magnetically recorded on the recording medium.

As described above, in VTRs, there is a rotary transformer between a magnetic head and a circuit for supplying signals to be recorded to the magnetic head or for amplifying signals to be reproduced by the magnetic head. Therefore, the transmission loss of the signals is large. In connection with a scheme for reducing this transmission loss, various proposals have been made. In these proposals, there is a method which provides electronic circuits such as a reproducing amplifier or a recording amplifier between a rotary transformer and a magnetic head.

In relation to the above method, as one mounting method, it has been proposed to provide such electronic circuits as described above on a circuit board, arrange this circuit board on the upper portion of a rotary drum, and connect the circuit board to a magnetic head and a rotary transformer through lead wires. In such devices, electronic circuits and other electronic components are provided closer to a magnetic head than in older devices. However, the electronic circuits and the rotary transformer are separated by a considerable distance. Thus, as far as a reduction of signal transmission loss is concerned, a larger improvement than in the older devices cannot be expected.

In response to these unsuccessful attempts at reducing signal transmission loss, an attempt was made to mechanically arrange a circuit board provided with electric circuits, etc. between a magnetic head and a rotary transformer in a rotary drum. However, a problem exists in that the manufacturing process becomes complicated as it is needed to connect magnetic heads and circuit boards, and a circuit board and a rotary transformer with a lead wire during actual mounting.

Further, there is also a mounting method to form a circuit board to fit the shape of a rotary transformer and paste the circuit board on the upper surface of the rotary transformer to facilitate the connection of the circuit board with the rotary transformer. However, in this case, it is also troublesome to connect the circuit board to the rotary transformer. Furthermore, another problem will be caused that it becomes difficult to install and remove a rotary drum as the circuit board is assembled integrally with the rotary transformer.

As described above, in the conventional rotary head apparatus, a circuit board having electronic components such as an electronic circuit, etc. is mounted, for instance, on a rotary drum. Thus there is no possibility of loss of signal components being transmitted in a signal transmission mechanism which performs magnetic recording/ reproducing on/from a recording medium using a magnetic head provided on the rotary drum, because such electronic components as the electronic circuit, etc. are installed near the magnetic head. However, there still remains such a problem that a distance between the electronic circuit and the rotary transformer provided in the rotary drum becomes fairly great and thus signals being transmitted may be adversely affected.

Further, for the purpose of solving the problems described above, if the circuit board is formed so as to be located between the magnetic head and the rotary transformer, and that the distance between the circuit board and magnetic head is shortened by arranging the circuit board between the magnetic head and the rotary transformer, the problem of transmitting signals affected by a distance may be solved. However, the problem that the structures of the magnetic head and the circuit board or the rotary transformer and their mutual connections become extremely difficult remains.

SUMMARY OF THE INVENTION

The present invention is made in view of the problems in the conventional apparatus as described above.

It is, therefore, an object of the present invention to provide a rotary head apparatus with a circuit board provided at an optimum smallest distance therefrom without increasing a distance between a magnetic head and a rotor of a rotary transformer. The present invention is capable of connecting the head and circuit board in a simple construction and effectively communicating signals therebetween.

In order to achieve the above object, a rotary head apparatus according to a first aspect of the present invention comprises a rotary shaft, a rotary drum fixed to the rotary shaft, a magnetic head which has a winding and is provided on the rotary drum, a stationary drum for rotatably supporting the rotary shaft, a rotary transformer including a rotor and a stator which are electromagnetically coupled with one another, the rotor having a winding and being fixed to the rotary drum so that the rotor may jointly rotate with the rotary drum while the stator being mounted on the stationary drum, and a circuit board mounted in the rotary drum so as to rotate jointly with the rotary drum and provided with a first surface carrying a first conductive member, a second surface carrying a second conductive member, an electronic circuit provided on at least one of the surfaces, a circuit wiring for communicating signals among the electronic circuit, the first and the second conductive members, the first conductive member being in contact with a lead terminal of the winding of the magnetic head for establishing an electrical connection therebetween, the second conductive member being in contact with a lead terminal of the winding of the rotor of the rotary transformer for establishing another electrical connection therebetween.

A rotary head apparatus according to a second aspect of the present invention further including the first and the second conductive members installed in the rotary drum on opposite positions in reference to the circuit board, and the electronic circuit is provided between the first and the second conductive members.

A rotary head apparatus according to a third aspect of the present invention further include an electronic circuit that has an integrated circuit mounted on a position remote from the first conductive member and including an amplifier circuit for amplifying signals reproduced by the magnetic head.

A rotary head apparatus according to a fourth aspect of the present invention further includes the first and the second conductive members having elastic members which are in elastical contact with the respective lead terminals of the windings.

A rotary head apparatus according to a fifth aspect of the present invention comprises a rotary shaft, a rotary drum fixed to the rotary shaft, a plurality of magnetic heads that have windings, respectively, and that are provided on the rotary drum at symmetrical locations with respect to each other in reference to the rotary shaft, a stationary drum for rotatably supporting the rotary shaft, a rotary transformer including a rotor and a stator which are electromagnetically coupled with each other, the rotor having a winding and being fixed to the rotary drum so that the rotor may jointly rotate with the rotary drum while the stator is mounted on the stationary drum, and a circuit board mounted in the rotary drum so as to rotate jointly with the rotary drum and provided with a first surface carrying a first conductive member, a second surface carrying a second conductive member, an electronic circuit provided on at least one of the surfaces, a circuit wiring for communicating signals among the electronic circuit and the first and the second conductive members, the first conductive member being in contact with a lead terminal of the winding of the magnetic head for establishing an electrical connection therebetween, the second conductive member being in contact with a lead terminal of the winding of the rotor of the rotary transformer for establishing another electrical connection therebetween.

A rotary head apparatus according to a sixth aspect of the present invention further includes first and second conductive members that are installed in the rotary drum in positions symmetrical with each other in reference to the circuit board, and the electronic circuit is provided between the first and the second conductive members.

A rotary head apparatus according to a seventh aspect of the present invention further includes an electronic circuit that has an integrated circuit mounted on a position fairly remote from the first conductive member and includes amplifier circuit for amplifying signals reproduced by the magnetic head.

A rotary head apparatus according to an eighth aspect of the present invention further includes first and the second conductive members installed in the rotary drum on opposite positions in reference to the circuit board.

A rotary head apparatus according to a ninth aspect of the present invention further includes first and second conductive members having elastic members which are in elastical contact with the respective lead terminals of the windings.

A rotary apparatus according to a tenth aspect of the present invention comprises a rotary shaft, a rotary member fixed to the rotary shaft, a stationary drum for rotatably supporting the rotary shaft, a rotary transformer including a rotor and a stator which are electromagnetically coupled with each other, the rotor having a winding and being fixed to the rotary member so that the rotor may jointly rotate with the rotary member while the stator is mounted on the stationary drum, and a circuit board mounted in the rotary drum so as to rotate jointly with the rotary drum and provided with a first surface carrying a first conductive member, a second surface carrying a second conductive member, an electronic circuit provided on at least one of the surfaces, a circuit wiring for communicating signals among the electronic circuit, the first and the second conductive members, the first conductive member being in contact with a lead terminal of the winding of the magnetic head for establishing an electrical connection therebetween by being rotatably mounted to the rotary drum so as to rotate jointly with the rotary drum, the second conductive member being in contact with a lead terminal of the winding of the rotor of the rotary transformer for establishing another electrical connection therebetween due to the rotary drum being mounted to the rotary member.

A rotary head apparatus according to an eleventh aspect of the present invention further includes first and second conductive members having elastic members which are in elastical contact with the respective lead terminals of the windings.

In the present invention, only when the circuit board with the first and the second conductive members and the electronic circuit member installed thereon is mechanically mounted between a plurality of magnetic heads and the rotary transformer mounted to the rotary drum is it possible to make the required electrical connections. As a result, signals obtained by the magnetic heads can be supplied to the electronic circuit member via the first conductive member and the signals amplified in the electronic circuit are supplied to the rotor of the rotary transformer via the second conductive member. Thereafter, the signals passing through the rotor are transmitted to the stator electromagnetically connected with the rotor and communicated with an external electronic circuit, etc. via lead wires.

Additional objects and advantages of the present invention will become apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
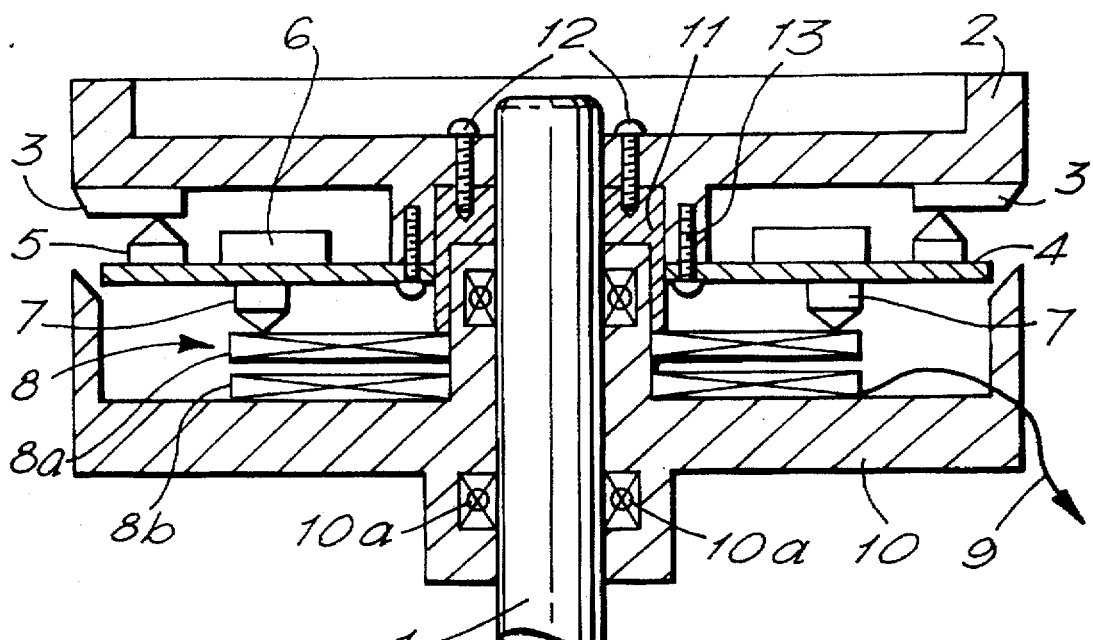
FIG. 1 is a diagram showing in section the entirety of the first embodiment of the rotary head apparatus according to the present invention.

The present invention will be described in detail with reference to FIGS. 1 through 3.

Throughout the drawings, like or equivalent reference numerals or letters will be used to designate like to equivalent elements for simplicity of explanation.

Figure 2:
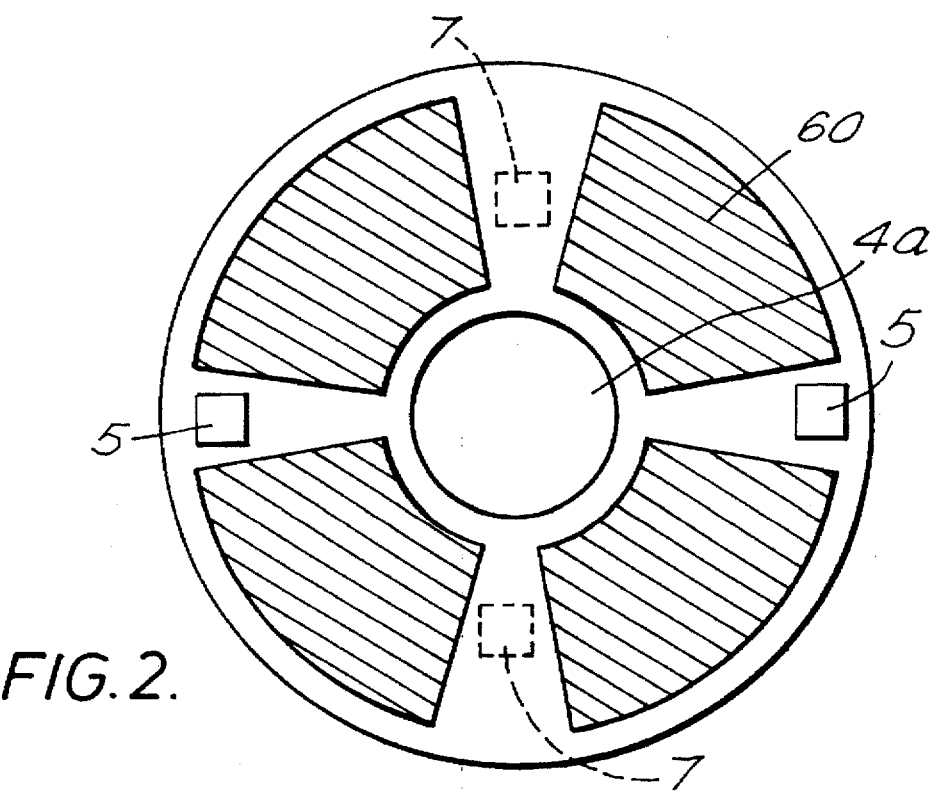
FIG. 2 is a plan view showing the circuit board mounted to the rotary drum shown in FIG. 1.

Referring now to FIGS. 1 and 2, a first embodiment of the rotary head apparatus according to the present invention will be described in detail.

FIG. 1 shows a cross-sectional view of the rotary head apparatus of the first embodiment. FIG. 2 shows a plan view of the circuit board mounted to the rotary drum shown in FIG. 1.

As illustrated in FIG. 1, the rotary head apparatus includes a rotary drum 2 which rotates jointly with a rotary shaft 1. The rotary head apparatus further includes magnetic heads 3 mounted at prescribed positions of the rotary drum 2 project a given amount from the peripheral surface of the drum 2 so that the heads 3 are in contact with a magnetic recording medium that travels along the peripheral surface of the rotary drum 2. A disc-shaped circuit board 4 having a hole 4a through which the shaft 1 penetrates is disposed at the center of its apparatus. First conductive members 5, which are mounted on the outer edge of the upper surface of the circuit board 4 and which face the magnetic heads 3 while being in contact with lead terminals of windings of the magnetic heads 3, make electric connections with Leads 3. An electronic circuit member 6 is provided in a specified area of the circuit board 4. The circuit member 6 being connected to the first conductive members 5 by printed wires and being equipped with a preamplifier for amplifying signals from the magnetic heads 3 at a fixed amplification factor. Second conductive members 7 are provided on the under surface of the circuit board 4 and connected to the electronic circuit member 6 by printed wires. A rotary transformer 8 comprises a rotor 8a having a winding of which lead terminals are electrically connected to the second conductive member 7 via contact therebetween and a stator 8b for transmitting signals by being electromagnetically connected with the rotor 8a. A stationary drum 10 is fixed to the stator 8b of the rotary transformer 8.

Further, the first and the second conductive members 5 and 7 are provided at positions symmetrical with each other in reference to the rotary shaft 1.

In addition, a rotary member 11 is fitted to the rotary shaft 1 and the rotary drum 2 is mounted to the rotary member 11 with mounting screws 12. Therefore, the rotary drum 2 rotates jointly with the rotation of the rotary shaft 1. Disc shape projections are formed near the center of the underside of the rotary drum 2 and the circuit board 4 is mounted to the ends of the projections with mounting screws 13. Thus, the circuit board 4 also rotates jointly with the rotary drum 2.

Further, at the center of the stationary drum 10 there are a plurality of bearings 10a provided to face each other at contact points with the rotary shaft 1 so that when passing through the penetrating hole provided on the stationary drum 10, the rotary shaft 1 is able to rotate freely without reducing the rotary speed.

There are also printed circuit wirings (not shown) provided on both sides of the circuit board 4 that constitute predetermined electric circuits. The printed circuit wirings provided on both sides are mutually and electrically connected by way of through-holes, etc. As illustrated in FIG. 2, there are arrangement areas 60 provided on the upper surface of the circuit board 4, which are functionally optimum arranging areas of the electronic circuit members 6, and electrodes (not shown) for being soldered with lead terminals of the electronic circuit members 6 are formed in this arrangement areas 60. These electrodes are connected with the circuit wirings and the electronic circuit members 6 are electrically and mechanically mounted to the circuit board 4 through soldering. As a result, the electronic circuit members 6 are connected with the first conductive members 5 installed on the circuit board 4 and further, with the second conductive members 7 installed on the back (the under surface) of the circuit board 4. the electronic circuit member 6 is given by an integrated circuit device including a preamplifier circuit for amplifying signals reproduced by the magnetic head. As necessary, resistors and capacitors are mounted to the circuit board 4 to constitute an electronic circuit together with the electronic circuit member 6.

To assemble a rotary head apparatus in such a structure as described above, for instance, the rotor 8a of the rotary transformer 8 is fixed to the rotary member 11 and then the rotary member 11 is fit into the rotary shaft 1 supported by the stationary drum 10 in the rotatable state. Further, the circuit board 4 is mounted to the rotary drum 2 with the mounting screws 13, and the lead terminals of the winding (not shown) of the magnetic head 3 are in contact with the first conductive member 5. The rotary drum 2 is mounted with the circuit board 4 to the rotary member 11 with the mounting screws 12. The second conductive members 7 are in contact with the lead terminals of the windings of the rotor 8a of the rotary transformer 8. The rotary head apparatus is assembled in such a manner as described above, and is disassembled in an order reverse to that of the assembly. Further, the first and the second conductive members 5 and 7 are elastic and are elastically contacted with the respective lead terminals of the windings.

On the rotary head apparatus with the structure as described above, as the circuit board 4 is provided between the magnetic head 3 mounted to the rotary drum 2 and the rotor 8a of the rotary transformer 8 mounted to the rotary member 11 which rotates jointly with the rotary drum 2 as described above, it is possible to arrange the magnetic head 3 and the rotor 8a with the shortest distance therebetween. Furthermore, as the magnetic head 3 and the rotor 8a contact each other via the first conductive members 5, the electronic circuit member 6 and the second conductive members 7, signals can be certainly communicated among them.

Now the operation of this embodiment will be explained in detail with reference to FIG. 1.

For instance, when an operation of reproducing signals is performed using the rotary head according to this embodiment, signals recorded by the magnetic head 3 mounted to the rotary drum 2 are reproduced from a magnetic recording medium (not shown) which travels along the outer surface of the rotary drum 2. As these reproduced signals are signals at a high frequency band but low in signal level, the signals must be amplified at a certain amplification factor. When reproduced, the signals are supplied to the electronic circuit member 6 on the circuit board 4 via the first conductive members 5, which are in contact with and electrically connected to the lead terminals of the winding of the magnetic head 3. The reproduced signals supplied to the electronic circuit member 6 are amplified at the prescribed amplification factor by, for instance, a preamplifier, etc. The amplified reproduced signals are transmitted to the rotor 8a of the rotary transformer 8 via the second conductive members 7 which are conducted to the electronic circuit member 6 with the circuit board 4 clamped between them. The reproduced signals transmitted to the rotor 8a are transmitted to the stator 8b by the electromagnetic connection of the rotary transformer comprising the rotor 8a and the stator 8b, and then transmitted to an external electronic circuit, etc. (not shown) via a lead wire 9 which is connected to the stator 8b. Thus, the signals recorded on a recording medium can be reproduced.

Further, when a recording operation is performed using this rotary head apparatus, the members for the signal transmission in the reproducing operation are commonly used in the recording operation. That is, signals to be recorded magnetically are supplied from an external electronic circuit, etc. to the rotary transformer 8 via the lead wire 9. The signals supplied to the rotary transformer 8 are transmitted to the electronic circuit member 6 on the circuit board 4 via the stator 8b and the rotor 8a of the rotary transformer 8 and the second conductive members 7. Then, voltages and currents required for the recording operation are supplied by a recording amplifier provided to the electronic circuit member 6. The signals to be recorded are then supplied to the magnetic head 3 via the first conductive members 5 and recorded on a magnetic recording medium (not shown) by the magnetic heads 3.

Further, when replacing the magnetic head or other parts of the rotary head apparatus in this embodiment due to the expiration of their life, the rotary drum 2 assembled integrally with the magnetic head 3 can be easily removed by only removing the mounting screws 12, and furthermore, as the circuit board 4 with the electronic circuit member 6, the first and the second conductive members 5 and 7 are mounted to the rotary drum 2, the circuit board 4 also can be easily removed. Thus, it becomes possible not only to facilitate the works for replacing the parts. In other words, the assembling work of the rotary head apparatus but also the connection of respective members comprising the rotary head apparatus at optimum connecting positions. In addition, the positive signal transmission can be assured.

Therefore, according to the present invention, it is possible to establish a signal transmission path between the magnetic head 3 and the rotary transformer 8 with the optimum shortest distance between them by mounting the circuit board 4 with the first conductive members 5 and the electronic circuit member 6 provided in the arrangement area 60 on the upper surface of the electronic circuit member 6 and the second conductive members 7 provided on the under surface of the electronic circuit member 6 between the magnetic head 3 and the rotary transformer 8 mounted to the rotary drum 2. Therefore, it becomes possible to perform the recording or reproducing of signals without oscillations, etc. badly affecting the signals being transmitted. Further, the rotary drum 2 and the circuit board 4 can be removed by removing only the mounting screws 12 and it is also possible to easily connect the second conductive members and the electronic circuit member mounted on the circuit board, and in addition the mutual transmission of signals being assured.

Figure 3:
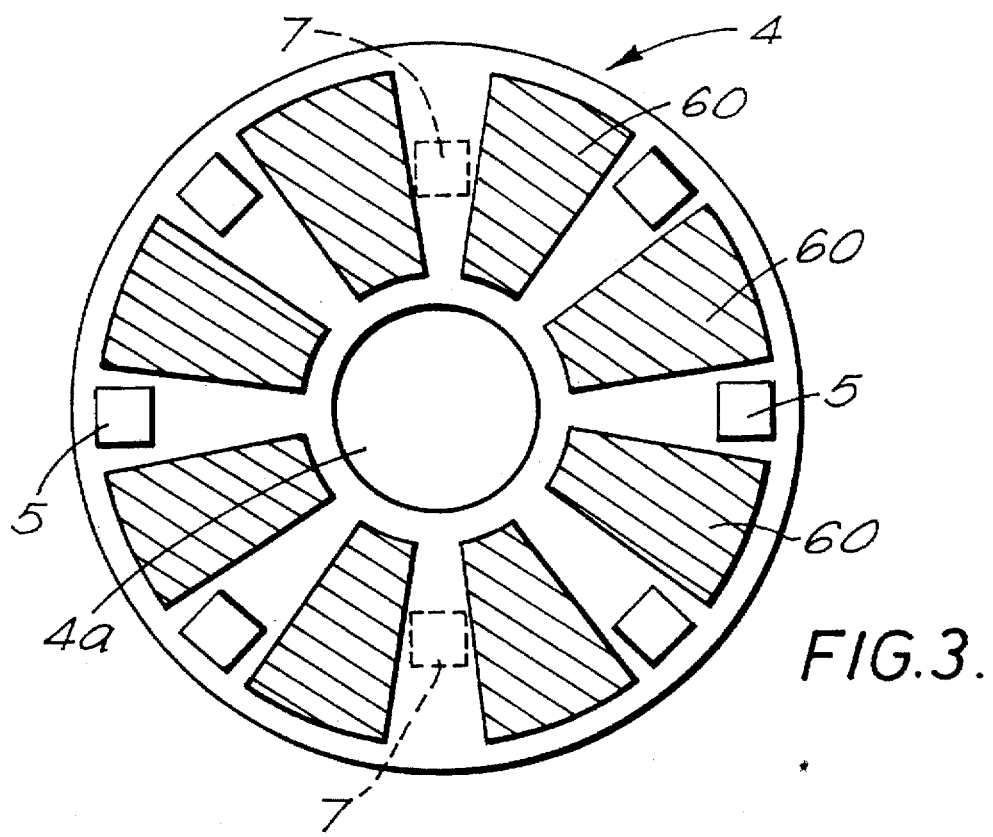
FIG. 3 is a diagram showing the circuit board for a second embodiment of the rotary head apparatus according to the present invention.

Referring now to FIG. 3, a second embodiment of the rotary head apparatus according to the present invention will be described. FIG. 3 is a plan view showing an improvement of the circuit board to be mounted to the rotary 6 head apparatus shown in FIG. 1. the same reference numerals or letters used in the first embodiment shown in FIGS. 1 and 2 will be used to designate like to equivalent elements and only parts different from the first embodiment will be explained.

This second embodiment is characterized in that if, for instance, two or more of the magnetic heads 3 are mounted to the rotary drum 2, in order to transmit or receive signals corresponding to these magnetic heads 3, a plurality of first conductive members that are in contact with the respective lead terminals of the windings of the magnetic heads are provided at positions symmetrical with respect to each other in reference to the rotary shaft 1. Correspondingly, the arrangement areas 60 are provided for placing the electronic circuit members 6 in positions most optimum for their functions.

Further, the operation when the circuit board 4 is used in the rotary head is the same as that in the first embodiment, and therefore the related explanation will be omitted.

Therefore, according to the second embodiment, even when a plurality of the magnetic heads are provided to the rotary drum 2, the first conductive members 5 are provided on the upper surface of the circuit board 4 to individually face the respective magnetic heads. Further, the electronic circuit members 6 are provided in the arrangement areas 60, which are functionally free from the effects of oscillation, etc. It is also possible to establish the signal transmission path to the magnetic heads 3 and the rotary transformer 8 with an optimum and shortest distance. It is possible to transmit signals with a high degree certainly without the signal being badly affected by oscillations, etc.

Figure 4:
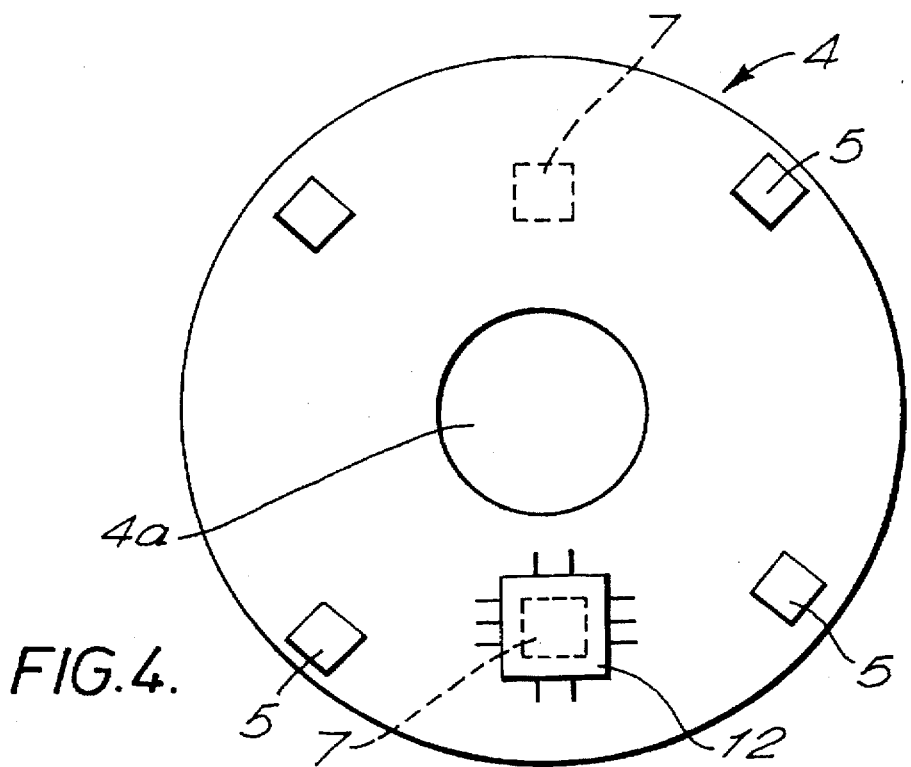
FIG. 4 is a diagram showing the circuit board for a third embodiment of the rotary head apparatus according to the present invention.

Referring now to FIG. 4, a third embodiment of the rotary head apparatus according to the present invention will be described. FIG. 4 shows a plan view of the circuit board including integrated circuits, etc., which are mounted in the rotary head apparatus shown in FIG. 1. The same reference numerals and letters used in the former embodiments will be used to designate like or equivalent elements and only parts different from these will be explained.

This third embodiment is characterized in that an integrated circuit 12 (hereinafter referred to as IC) is used for the electronic circuit member 6. The IC 12 is provided on the upper surface of the circuit board 4, that is, the same side as the magnetic head 3. As a result, the IC 12 faces the second conductive member 7 provided on the under surface of the circuit board 4.

The IC 12 provided on the upper surface of the circuit board 4 and the second conductive member 7 provided on the under surface of the circuit board 4 which faces the IC 12 are connected together by the IC 12 being inserted into a connecting hole (now shown) defined in the circuit board 4. Alternatively, the IC and the second conductive member are electrically connected by the printed wiring on the board.

Further, when mounting the circuit board 4 in the structure as described above to the rotary drum 2 and performing the reproduction/magnetic recording, the balance of rotation of the rotary drum may become a problem. In this embodiment, in order to balance the rotation so that the rotary drum 2 becomes symmetrical in its shape with reference to the rotary shaft 1, a member that does not function electrically but equalizes the moment by its mass may be provided at required positions of the circuit board 4 or the rotary drum.

All other elements and the operation are the same as those of the first embodiment and therefore, the explanation will be omitted.

Therefore, according to the third embodiment of the present invention, when the IC 12 is provided on the upper surface of the circuit board 4 so that it faces the second conductive member 7 provided on the under surface of the circuit board 4, i.e., the same side as the rotary transformer, it is possible to obtain a distance between the first conductive members 5 to which a low level signal is transmitted from the magnetic head 3. Thus, a malfunction due to, for instance, the effect of oscillation, etc. can be prevented.

Further, even when the circuit board 4 as constructed as above is mounted to the rotary drum 4, needless to say, it is possible to obtain the same effect as in the first and the second embodiments.

In addition, in the first and the second embodiments, the explanation has been made as to the electronic circuit member provided in the arrangement area provided on the surface of the circuit board at the same side as the magnetic head. This arrangement area may be provided, for instance, on the under surface of the circuit board, the same side as the rotary transformer, for providing the electronic circuit member in this arrangement area.

Further, in the first, second and third embodiments, the description discloses the first and the second conductive members as being provided at positions symmetrical with respect to each other in reference to the rotary shaft. In order to maintain the balance of rotation, for instance, another member may be mounted to the circuit board or in the rotary drum.

As described above, according to the present invention, as the first conductive member 5, which is in contact with and electrically connected to the lead terminals of the windings of the magnetic head 3, and the electronic circuit member 6, which is connected to the first conductive member 5, are provided on the upper surface, the same side as the magnetic head, of the circuit board 4 of the rotary drum, and the second conductive member 7, which is connected to the electronic circuit member 6, and is in contact with and connected to the lead terminals of the winding of the rotor 8a of the rotary transformer 8 is provided on the underside of the circuit board 4, it becomes possible to provide the circuit board 4 with the optimum and shortest distance between the magnetic head 3 and the rotor 8a of the rotary transformer 8. Thus, these elements are connected with each other in a simple construction. Further, the transmission loss of signals is reduced without being badly affected by oscillations, etc. Therefore, the signals can be transmitted with a higher degree of certainty.

As described above, the present invention can provide an extremely preferable rotary head apparatus.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A rotary head apparatus comprising:

a rotary shaft;

a cylindrical rotary drum fixed to the rotary shaft;

a plurality of magnetic heads to at least one of record and reproduce signals one of on and from a recording medium, said magnetic heads being disposed on the rotary drum at locations symmetrical with each other in reference to a prescribed longitudinal line of the rotary drum;

a plurality of lead terminals of the windings of the magnetic heads;

a stationary drum for rotatably supporting the rotary shaft;

a rotor of a rotary transformer, the rotor being fixed to the rotary drum so as to rotate jointly with the rotary drum, the rotor having a winding and having a lead terminal disposed at a position not overlapping with the magnetic heads in an axial direction;

a printed circuit board mounted in the rotary drum so as to be rotatable with the rotary drum and provided with a first surface carrying a first conductive member corresponding to each lead terminals of the windings of the plurality of magnetic heads, a second surface carrying a second conductive member corresponding to the lead terminal of the winding of the rotor of the rotary transformer, electronic circuit parts including integrated circuit devices for amplifying signals reproduced by the magnetic heads at a position between said magnetic heads provided on one of the first and second surfaces, a circuit wiring for communicating signals between the first and second conductive members through the electronic circuit parts, the first conductive member being in contact with the respective lead terminals of the windings of the magnetic heads for establishing an electrical contact therebetween, the second conductive member being in contact with the lead terminal of the winding of the rotor of the rotary transformer for establishing an electrical connection therebetween; and a stator of the rotary transformer provided on the fixed drum and being electromagnetically coupled to the rotor, wherein the integrated circuit devices are disposed at a position corresponding to the second conductive member on the same surface of the printed circuit board as the surface on which the first conductive member is disposed, and wherein the first and second conductive members are elastic and elastically contact the respective lead terminals of the winding, respectively.

2. A rotary head apparatus as claimed in claim 1, wherein the lead terminal of the winding of the rotor of the rotary transformer is provided along the line corresponding to the prescribed longitudinal line of the rotary drum.

* * * * *